(12) United States Patent
Toyosawa et al.

(10) Patent No.: US 10,684,700 B2
(45) Date of Patent: Jun. 16, 2020

(54) KEYBOARD THRESHOLD CHANGE APPARATUS AND KEYBOARD

(71) Applicant: Topre Corporation, Tokyo (JP)

(72) Inventors: Yuichi Toyosawa, Sagamihara (JP); Takatoshi Sato, Sagamihara (JP)

(73) Assignee: TOPRE CORPORATION, Tokyo (JP)

( * ) Notice: Subject to any disclaimer, the term of this patent is extended or adjusted under 35 U.S.C. 154(b) by 0 days.

(21) Appl. No.: 16/344,344

(22) PCT Filed: Oct. 10, 2017

(86) PCT No.: PCT/JP2017/037290
§ 371 (c)(1),
(2) Date: Apr. 23, 2019

(87) PCT Pub. No.: WO2018/079316
PCT Pub. Date: May 3, 2018

(65) Prior Publication Data
US 2020/0050284 A1   Feb. 13, 2020

(30) Foreign Application Priority Data
Oct. 25, 2016 (JP) .................................. 2016-208491

(51) Int. Cl.
*G06F 3/023* (2006.01)
*H01H 13/83* (2006.01)

(52) U.S. Cl.
CPC ............ *G06F 3/023* (2013.01); *H01H 13/83* (2013.01)

(58) Field of Classification Search
CPC .......... G06F 3/02; G06F 3/023; G06F 3/0238; G06F 3/0202; G06F 3/0219; H01H 13/82; H01H 9/18; H01H 13/70
See application file for complete search history.

(56) References Cited

U.S. PATENT DOCUMENTS

| | | | | | |
|---|---|---|---|---|---|
| 5,742,242 | A | * | 4/1998 | Sellers | ................. G06F 1/1616 200/5 R |
| 5,995,026 | A | * | 11/1999 | Sellers | ................. G06F 3/0202 341/22 |

(Continued)

OTHER PUBLICATIONS

Japanese Unexamined Patent Application Publication No. 62-144220, Electrostatic Capacity Type Keyboard Switch, Jun. 27, 1987, 9 pages (3 pages of Original Document and 6 pages of English Translation).

*Primary Examiner* — Laurence J Lee
(74) *Attorney, Agent, or Firm* — Kilpatrick Townsend & Stockton LLP (57) ABSTRACT

A keyboard threshold change apparatus and a keyboard in which thresholds of the ON-sensing positions of the keys can be individually changed and the thresholds can be checked with illumination colors. The apparatus includes a keyboard having a light illuminating key tops of a plurality of keys and a threshold change unit capable of changing, for each key, a threshold used to determine an occurrence of a press of the key; and a computer connected to the keyboard including a mouse to input the threshold and a display unit outputting the threshold input with the mouse as an image, when the threshold for a key is changed with the mouse, the threshold change unit changes, based on the changed threshold for the key from the computer, a threshold for the key in the keyboard, and the light changes an illumination color of the key for which the threshold is changed.

4 Claims, 9 Drawing Sheets

(56) References Cited

U.S. PATENT DOCUMENTS

| | | | | |
|---|---|---|---|---|
| 6,466,201 | B1* | 10/2002 | Koizumi | G06F 3/0202 345/168 |
| 9,742,402 | B1* | 8/2017 | Wang | H01H 13/14 |
| 10,276,328 | B1* | 4/2019 | Cheng | H01H 3/125 |
| 2003/0208324 | A1* | 11/2003 | Bellwood | G06F 3/0202 702/41 |
| 2004/0004559 | A1* | 1/2004 | Rast | G02B 27/017 341/34 |
| 2006/0238510 | A1* | 10/2006 | Panotopoulos | G06F 3/0202 345/168 |
| 2007/0182716 | A1* | 8/2007 | Cadene | G06F 3/04847 345/169 |
| 2011/0072257 | A1* | 3/2011 | Milchtaich | G06F 9/451 713/100 |
| 2015/0145763 | A1* | 5/2015 | Kamide | G06F 3/011 345/156 |
| 2015/0206672 | A1* | 7/2015 | Hsu | G06F 3/0202 307/115 |
| 2018/0166229 | A1* | 6/2018 | Chen | G06F 3/02 |
| 2018/0188949 | A1* | 7/2018 | Kaye | G06F 1/1626 |
| 2018/0232106 | A1* | 8/2018 | Zhang | G06F 3/0426 |

\* cited by examiner

KEYBOARD THRESHOLD CHANGE APPARATUS AND KEYBOARD

CROSS-REFERENCE TO RELATED APPLICATIONS

The present application is a national phase application under 35 U.S.C. § 371 of International Application No. PCT/JP2017/037290, filed Oct. 10, 2017, which claims priority from Japanese Patent Application No. 2016-208491, file Oct. 25, 2016, the contents of which are hereby incorporated by reference into this application.

BACKGROUND

Technical Field

The present invention relates to a keyboard threshold change apparatus and a keyboard in which thresholds of the ON-sensing positions of the respective keys in a key group can be changed.

Background Art

As keyboards for playing battle games using personal computers, keyboards having an illumination function (the key tops are illuminated in a dark environment) are preferably used. Quick operations are required during a game play, and some players prefer shorter keystrokes or the ON-sensing positions of keys (switches) (thresholds for determining the occurrence of a key press) higher (shallower) than a normal position. Further, specific keys are assigned individual functions, and therefore, it is desirable to set different ON-sensing positions for the respective keys.

PTL 1 describes a capacitive keyboard including key switches for which an ON-sensing position for determining the occurrence of a key press can be changed.

CITATION LIST

Patent Literature

PTL 1: Japanese Unexamined Patent Application Publication No. 62-144220

SUMMARY

Technical Problem

In PTL 1, however, it is possible to only collectively change the key ON-sensing position for all keys of the keyboard, and it is not possible to change the on-sensing position for each key. In a case where an identification device (circuit) in PTL 1 is provided for each key, the ON-sensing positions can be individually changed. However, the number of keys is large, and it is troublesome for the user to change and check the thresholds.

Accordingly, an object of the present invention is to provide a keyboard threshold change apparatus and a keyboard in which thresholds of the ON-sensing positions of the keys can be individually changed and the thresholds can be checked with illumination colors.

Solution to Problem

To achieve the object described above, a keyboard threshold change apparatus according to the present invention includes: a keyboard that includes an illumination unit illuminating key tops of a plurality of keys and a threshold change unit capable of changing, for each key among the keys, a threshold used to determine an occurrence of a press of the key; and a computer that is connected to the keyboard and that includes an input unit used to input the threshold and an image output unit outputting the threshold input with the input unit as an image, in which when the threshold for a key among the keys is changed with the input unit, the threshold change unit changes, on the basis of the changed threshold for the key from the computer, a threshold for the key in the keyboard, and the illumination unit changes an illumination color of the key for which the threshold is changed to a color corresponding to the threshold.

Further, a keyboard includes: an illumination unit that illuminates key tops of a plurality of keys; and a threshold change unit that is capable of changing, for each key among the keys, a threshold used to determine an occurrence of a press of the key, in which when the threshold for a key among the keys is changed by the threshold change unit, the illumination unit changes an illumination color of the key for which the threshold is changed to a color corresponding to the threshold.

Advantageous Effects of Invention

In the keyboard threshold change apparatus according to the present invention, when the threshold for a key is changed with the input unit of the computer, the threshold change unit changes, on the basis of the changed threshold for the key from the computer, a threshold for the key in the keyboard, and the illumination unit changes the illumination color of the key for which the threshold is changed to a color corresponding to the threshold. Accordingly, the thresholds of the ON-sensing positions of the keys can be individually changed. Further, the thresholds of the ON-sensing positions in the keyboard are indicated by the illumination colors in the keyboard, and therefore, the user can check which key has which threshold when looking at the keyboard.

DETAILED DESCRIPTION

Figure 1:
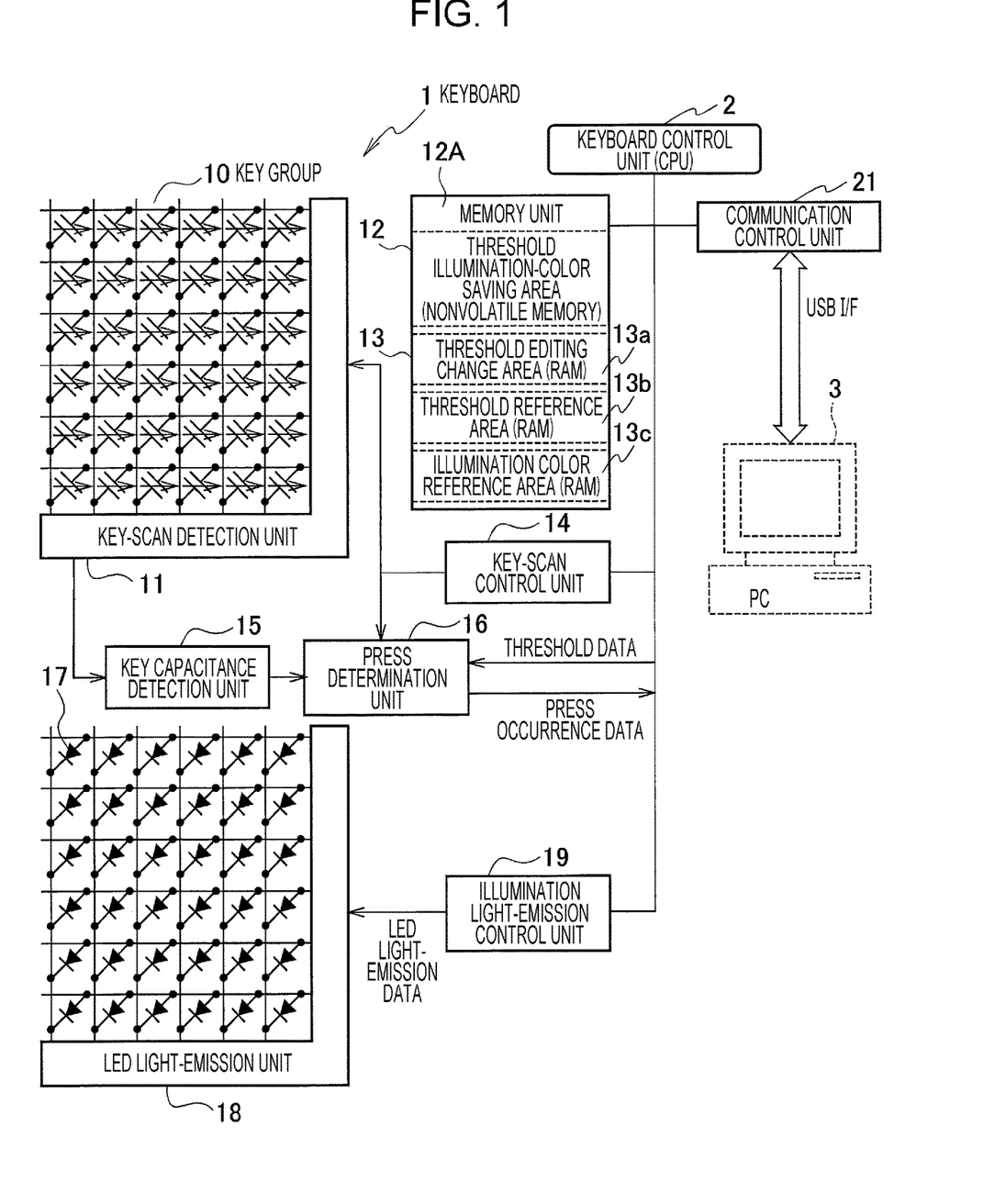
FIG. 1 is a block diagram illustrating a configuration of a keyboard according to a first embodiment of the present invention.

Hereinafter, embodiments of a keyboard threshold change apparatus and a keyboard according to the present invention will be described in detail with reference to the drawings. FIG. 1 is a block diagram illustrating a configuration of a keyboard according to a first embodiment of the present invention. The keyboard threshold change apparatus according to the present invention is constituted by a keyboard 1 and a personal computer (PC) 3 that is connected to the keyboard 1.

(Configuration of Keyboard 1)

The keyboard 1 determines the occurrence of a key press on the basis of a change in a capacitance (analog value), and changes a threshold used to determine the occurrence of a key press to thereby change the ON-sensing position of the key. The keyboard 1 includes a keyboard control unit 2, a key group 10, a key-scan detection unit 11, a memory unit 12A, a key-scan control unit 14, a key capacitance detection unit 15, a press determination unit 16, an illumination LED 17, an LED light-emission unit 18, an illumination light-emission control unit 19, and a communication control unit 21. The keyboard control unit 2 controls the memory unit 12A, the key-scan control unit 14, the press determination unit 16, the illumination light-emission control unit 19, and the communication control unit 21 in the keyboard 1.

Figure 9:
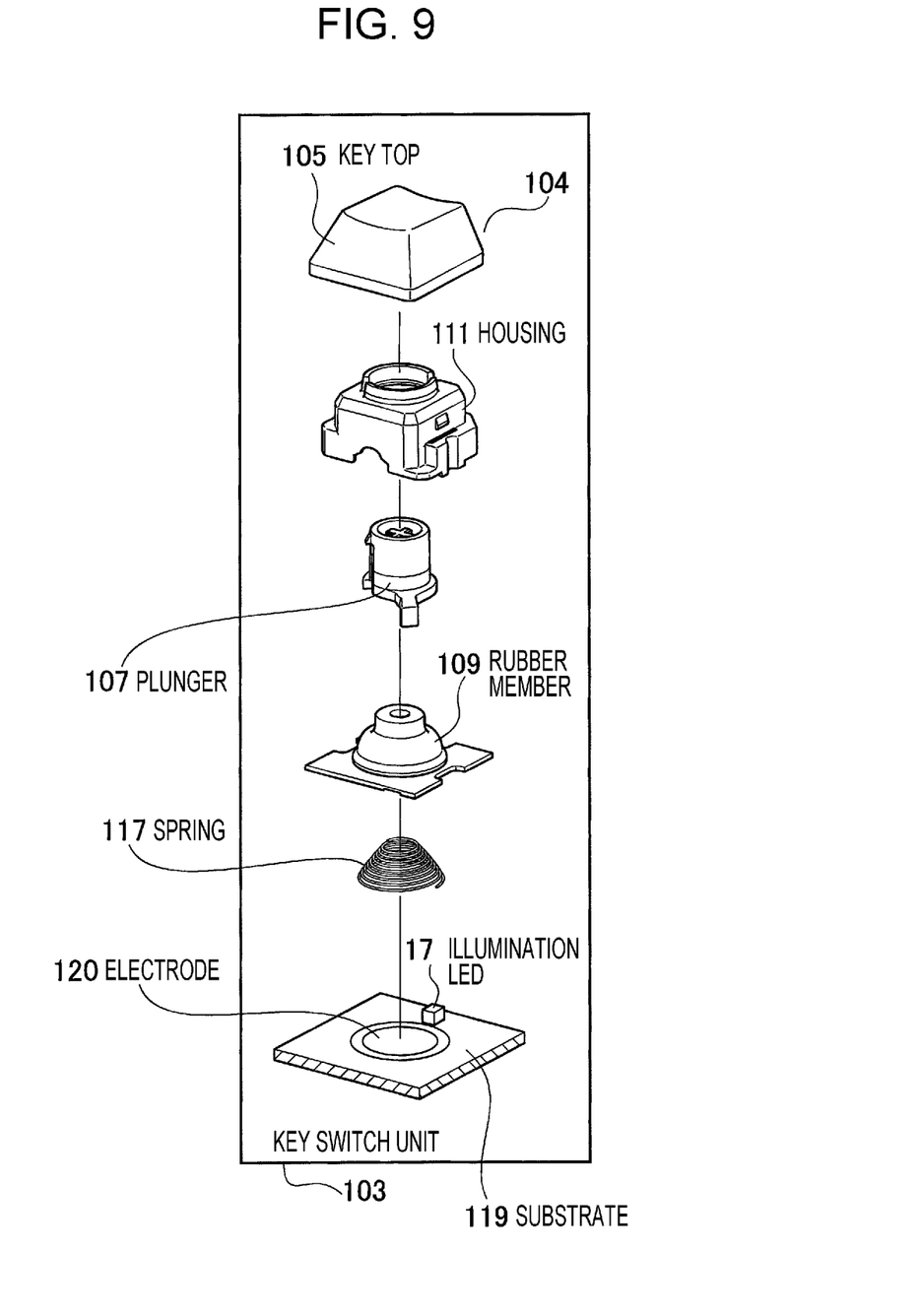
FIG. 9 is a diagram illustrating in detail a key switch unit of the keyboard according to the present invention.

The key group 10 includes keys in m rows and n columns as an electrical circuit. Each key in the key group 10 is formed of a key switch unit 103. The key switch unit 103 is constituted by a capacitive key switch 104 and the illumination LED 17. FIG. 9 is an exploded view of one key switch unit 103 to show the structure of the key switch unit 103. The key switch 104 includes a key top 105, a plunger 107, a rubber member 109, a housing 111, a plate not illustrated, a spring 117, and a substrate 119. The key top 105 moves up and down when subjected to pressing force from an operator. The plunger 107 is engaged with a lower part of the key top 105 and moves up and down together with the key top 105. The rubber member 109 is arranged on the lower side of the plunger 107 and supports the plunger 107 from below. The housing 111 is arranged on the circumferential side of the plunger 107 and the rubber member 109. The plate is supported by the housing 111 and extends in the lateral direction. The spring 117 is arranged on the lower side of the rubber member 109. When the key top 105 is pressed, the spring 117 yields, and a capacitance formed between the spring 117 and an electrode 120 changes to thereby detect the press.

The illumination LED 17 corresponds to an illumination unit of the present invention. The illumination LED 17 is mounted on the substrate 119, is an integrated three-color LED of blue, red, and green arranged in the vicinity of the key switch 104, and illuminates a letter on the key top 105. Note that, in FIG. 1, the illumination LED 17 is included in the LED light-emission unit 18. The illumination light-emission control unit 19 controls the illumination LED 17 in accordance with illumination color reference data in an illumination color reference area of a RAM 13. The actual issuance colors of the LED light-emission unit 18 are three colors, namely, blue, green, and red.

The memory unit 12A is constituted by a nonvolatile memory 12 formed of a flash memory and the random access memory (RAM) 13. In the nonvolatile memory 12, threshold data, threshold reference data, and the illumination color reference data are saved in advance in a threshold illumination-color saving area. That is, in the nonvolatile memory 12, threshold data for a key ON-sensing position is saved in advance for each of the keys in m rows and n columns in the key group 10.

The threshold data includes thresholds of the ON-sensing positions of the keys, and the number of thresholds is equal to three times the number of keys (thresholds corresponding to shallow, medium, and deep keystrokes and used to determine a key press). The threshold reference data includes information indicating which of the three thresholds is selected (a shallow, medium, or deep keystroke). The illumination color reference data includes color information about three colors (blue, green, and red), and color data associated with the three thresholds, specifically, color data indicating that "shallow" is expressed by blue, "medium" is expressed by green, and "deep" is expressed by red, is saved. At the time of start-up, the threshold data, the threshold reference data, and the illumination color reference data in the threshold illumination-color saving area of the nonvolatile memory 12 are transferred to the RAM 13.

In the RAM 13, the threshold data (including thresholds for the number of keys×3), the threshold reference data, and the illumination color reference data transferred from the nonvolatile memory 12 are saved in a threshold editing change area 13a, a threshold reference area 13b, and an illumination color reference area 13c respectively. The threshold editing change area 13a is an area in which three types of thresholds are saved for the number of keys. The threshold reference area 13b is an area in which information indicating which of the three thresholds is selected for each key is saved. The illumination color reference area 13c is an area in which color data corresponding to the selected threshold is saved for each key.

The keyboard control unit (CPU) 2 controls the entire keyboard 1 and collectively performs key input control described below and keyboard control in an ON-position change mode or an illumination color change mode of a keyboard change program.

The key-scan control unit 14 selects a target key address in the key group 10 and detects the threshold data at a memory address corresponding to the selected target key address from the RAM 13. The key-scan detection unit 11 continuously scans the key group 10 and detects the key address selected by the key-scan control unit 14. The key capacitance detection unit 15 detects and outputs to the press determination unit 16 the capacitance of a key at the key address detected by the key-scan detection unit 11. Further, the key-scan control unit 14 outputs the selected key address described above to the keyboard control unit 2. The keyboard control unit 2 reads, on the basis of data, in the threshold reference area 13c of the RAM 13, indicating which threshold ("shallow", "medium", or "deep") is selected for the selected key, a corresponding threshold from the threshold editing change area 13a as the threshold for the key, and outputs the threshold to the press determination unit 16.

The press determination unit 16 determines that a key press occurs (key on) in a case where a voltage from the key capacitance detection unit 15 is equal to or higher than the threshold or determines that a key press does not occur (key off) in a case where the voltage is lower than the threshold, and outputs key press occurrence data to the communication control unit 21. The communication control unit 21 communicates with the PC 3 and is formed of a general USB interface.

(Configuration of PC 3)

Figure 2:
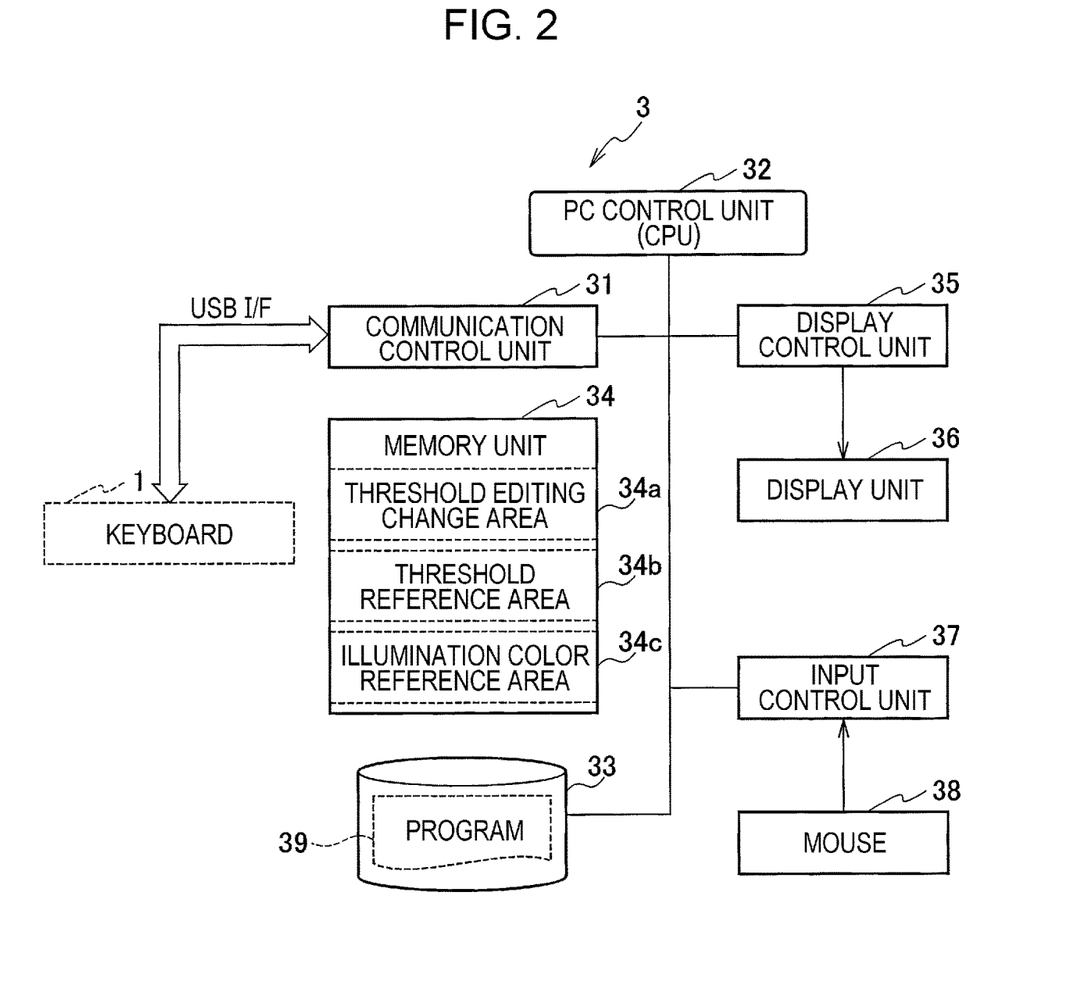
FIG. 2 is a block diagram illustrating a configuration of a personal computer connected to the keyboard according to the first embodiment.

Now, the configuration of the PC 3 is described with reference to FIG. 2. The PC 3 includes a communication control unit 31, a PC control unit 32, a hard disk 33, a memory unit 34, a display control unit 35, a display unit 36, an input control unit 37, and a mouse 38. That is, the PC 3 is a general-purpose personal computer, and the operating system (OS) is, for example, Windows (registered trademark) having a multitask function and a graphical user interface (GUI) function.

The PC control unit 32 is formed of a CPU and controls each unit in the PC 3. The communication control unit 31 is formed of a USB interface via which communication with the keyboard 1 is performed. In the hard disk 33, a keyboard program 39 is saved. The PC control unit 32 reads and executes the keyboard program 39. The threshold data, the threshold reference data, the illumination color reference data, and so on can be written to and read from the hard disk 33.

The memory unit 34 has a threshold editing change area 34a in which the threshold data is saved, a threshold reference area 34b in which the threshold reference data is saved, and an illumination color reference area 34c in which the illumination color reference data is saved. By the keyboard program 39, values saved in these three areas are always kept identical to values saved in the threshold editing change area 13a, the threshold reference area 13b, and the illumination color reference area 13c of the memory unit 12A of the keyboard.

The display control unit 35 controls the display unit 36. The display unit 36 corresponds to an image output unit of the present invention. The display unit 36 displays thresholds read from the memory unit 34 and displays thresholds changed with the mouse 38. The user changes a threshold for the keyboard 1 and checks the result of change while looking at the screen of the display unit 36.

The display unit 36 is generally called a display and, when the threshold for a key is changed with the mouse 38, displays an image of the key in a color the same as the illumination color of the key changed in the keyboard 1. Further, the display unit 36 receives a key code from the keyboard 1 and displays the image of the key in a color the same as a color other than the illumination color of the key changed by the illumination LED 17.

The mouse 38 corresponds to an input unit of the present invention. The mouse 38 is used to input a threshold and change a threshold. The input control unit 37 simultaneously outputs a threshold input with the mouse 38 to the display unit 36 via the display control unit 35. Accordingly, the user can operate the mouse 38 to change a threshold while looking at the screen of the display unit 36. Instead of the mouse 38, the user may use a touch panel interface placed on the surface of the screen and input a threshold by touching the screen.

(Input Processing by Keyboard 1)

Now, operations of the keyboard and the keyboard threshold change apparatus of the first embodiment thus configured are described. First, a key input function of the keyboard 1 is described with reference to FIG. 3.

Figure 3:
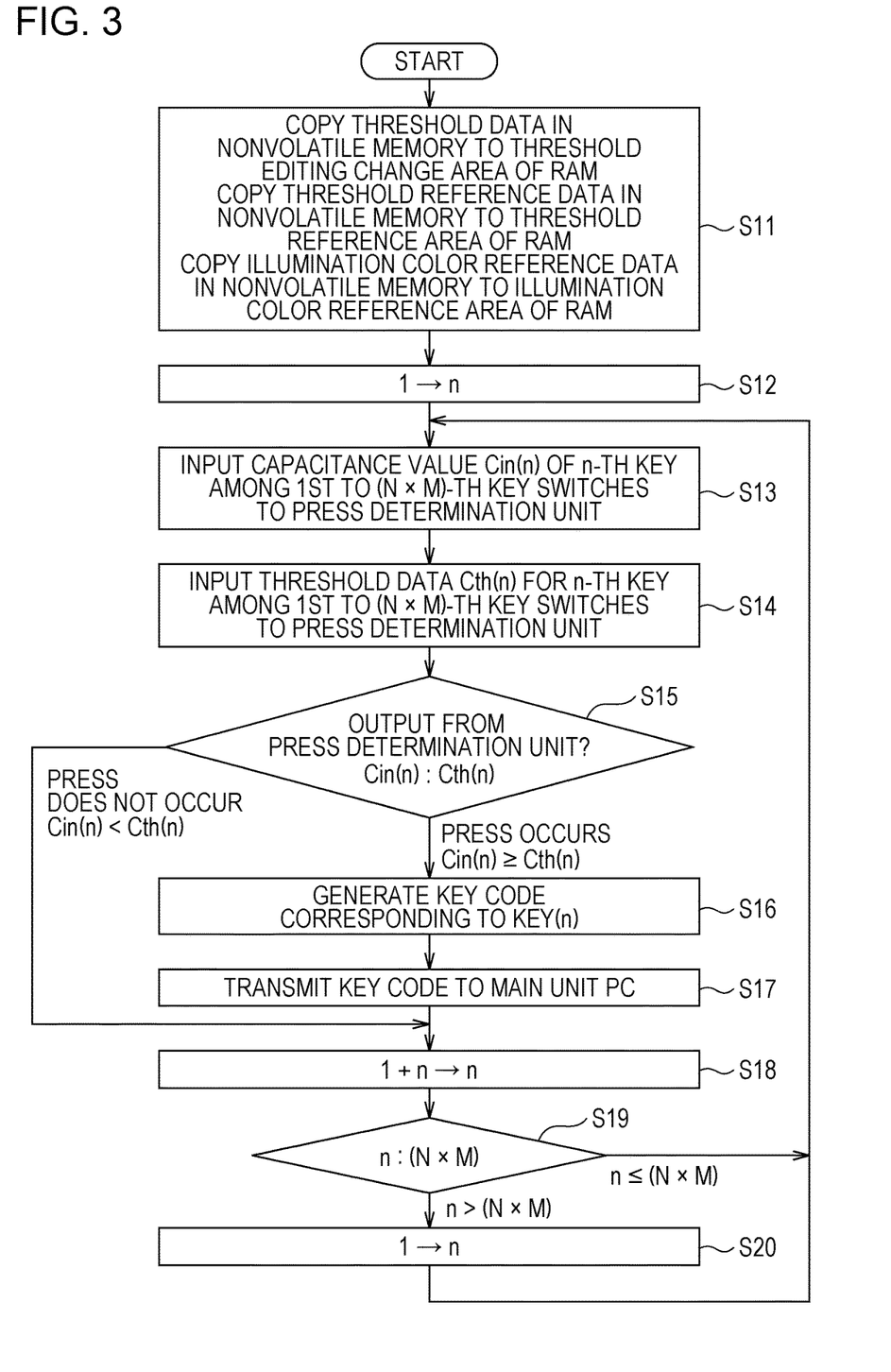
FIG. 3 is a flowchart illustrating key input control by the keyboard according to the first embodiment of the present invention.

The keyboard 1 according to the first embodiment has a function similar to that of typical keyboards, that is, a function of transmitting, in response to key input, a key code corresponding to the key input to the PC 3. First, when the keyboard 1 is connected to an USB port of the PC 3 and is supplied with power, the threshold data saved in the threshold illumination-color saving area of the nonvolatile memory 12 is copied to the threshold editing change area 13a of the RAM 13 in accordance with a control program not illustrated. Further, the threshold reference data is copied to the threshold reference area 13b, and the illumination color reference data is copied to the illumination color reference area 13c (step S11). Accordingly, the keyboard 1 is ready for use.

Next, n is set to 1 (step S12), where n represents the n-th key. Next, the key-scan control unit 14 outputs to the key-scan detection unit 11 an instruction for scanning the n-th key among the first to (N×M)-th keys.

The key-scan detection unit 11 scans the n-th key, and the key capacitance detection unit 15 detects the capacitance (Cin value) of the n-th key and outputs the capacitance value to the press determination unit 16 (step S13). In accordance with an instruction from the key-scan control unit 14, the press determination unit 16 reads the threshold data (Cth value) that corresponds to the threshold reference data ("shallow", "medium", or "deep") for the n-th key from the threshold editing change area of the memory unit 13, and outputs the threshold data to the press determination unit 16 (step S14).

The press determination unit 16 compares the capacitance, namely, the Cin value, with the threshold data, namely, the Cth value, and determines whether a key press occurs (step S15). In a case of Cin≥Cth, it is determined that a key press occurs. In a case of Cin<Cth, it is determined that a key press does not occur. Further, the press determination unit 16 outputs press occurrence data for the n-th key to the keyboard control unit 2.

The keyboard control unit 2 generates a key code corresponding to the key that is determined to be pressed on the basis of the press occurrence data for the n-th key from the press determination unit 16 (step S16). The key code is obtained by referring to a data conversion table (not illustrated) for converting a pressed key to a key code. The keyboard control unit 2 transmits the key code to the PC 3 via the communication control unit 21 (step S17).

Subsequently, n is incremented by 1 (step S18), and it is determined whether n is equal to or smaller than (N×M) n is equal to or smaller than (N×M) (step S19). If n is equal to or smaller than (N×M), the flow returns to step S13, and the process in step S13 and the subsequent steps is repeated. If n exceeds (N×M), n is set to 1 (step S20), the flow returns to step S13, and the process in step S13 and the subsequent steps is repeated.

Note that the processing described above is simultaneously performed by the multitask function even while control described below (ON-position set mode), etc. is performed.

As described above, in the keyboard according to the first embodiment, the threshold data for determining the occurrence of a key press is set for each of the plurality of keys, and the press determination unit 16 compares the capacitance, namely, the Cin value, with the threshold data, namely, the Cth value, to determine the occurrence of a key press. That is, the occurrence of a key press is determined, and when the threshold for determining the occurrence of a key press is changed, the ON-sensing position of the key can be changed.

(Processing by Keyboard Program in PC 3)

Now, processing by the keyboard program 39 in the PC 3 is described. The PC control unit 32 loads the keyboard program 39 saved in the hard disk 33 to the memory unit 34 and executes the keyboard program 39. The keyboard program 39 is software for Windows and uses the GUI, with which the user can change a threshold, etc. for the keyboard 1 by operating the mouse 38 while looking at the display unit 36.

Figure 4:
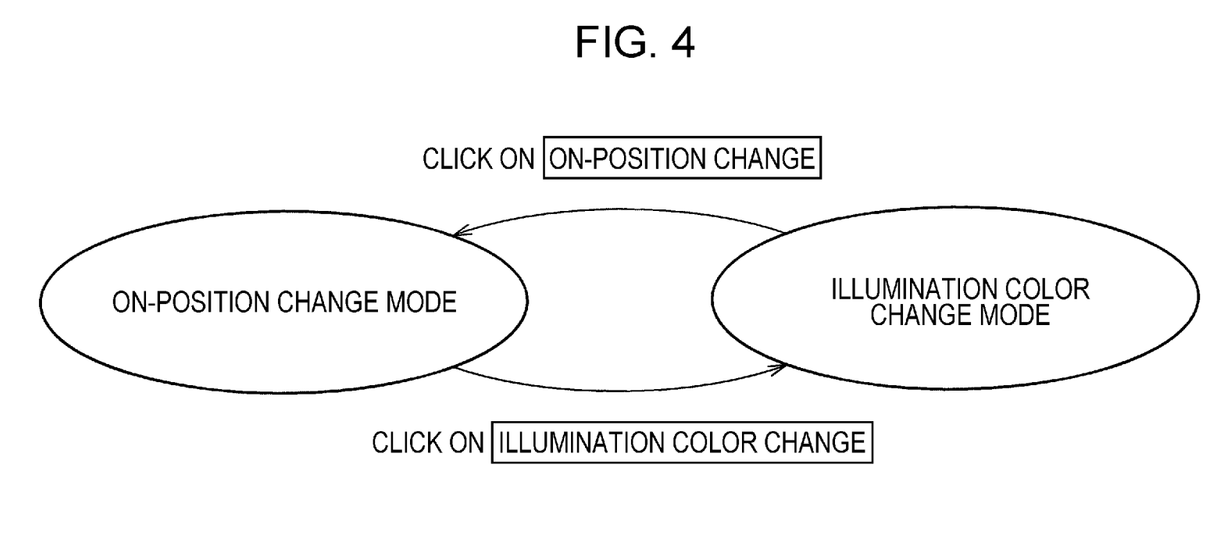
FIG. 4 is a state transition diagram illustrating mode changes in a keyboard program of the personal computer according to the first embodiment.

The program 39 has at least two modes, namely, the illumination color change mode and the ON-position change mode as illustrated in FIG. 4, and one of the modes is selected by a click operation with the mouse 38. When the mouse 38 is used to click on an ON-position change 40 on the screen illustrated in FIG. 6, the mode transitions to the ON-position change mode. When the mouse 38 is used to click on an illumination color change 41 on the screen illustrated in FIG. 6, the mode transitions to the illumination color change mode. The illumination color change mode is a mode in which the illumination color of the key top 105 can be changed for each key while the keyboard 1 is normally used. Here, the ON-position change mode, which is a feature of the present invention, is mainly described.

Figure 6:
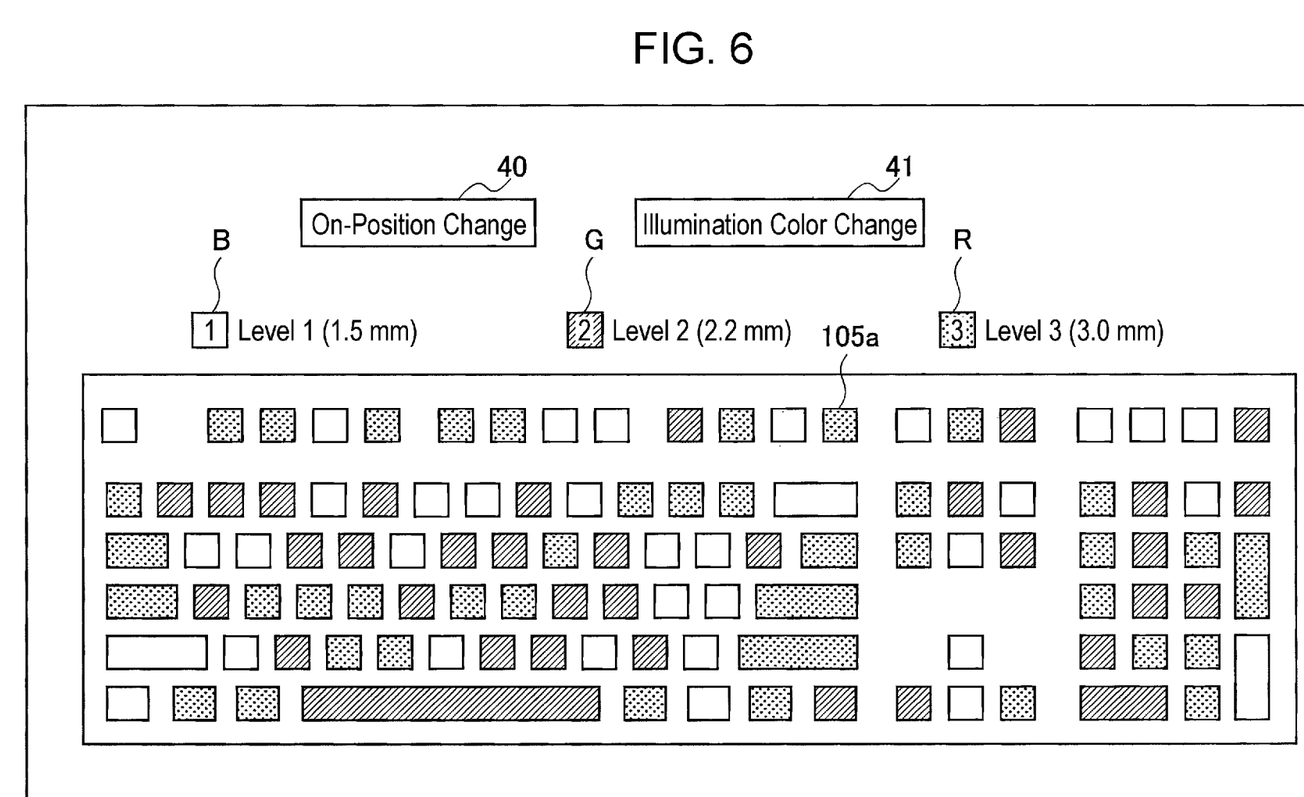
FIG. 6 is a diagram illustrating an example screen of a program for changing ON positions in the keyboard according to the first embodiment.

When the ON-position change mode is selected, the PC control unit 32 transfers and copies, via the communication control unit 31, the threshold data saved in the threshold editing change area 13a of the RAM 13 of the keyboard 1, the threshold reference data in the threshold reference area 13b, and the illumination color reference data in the illumination color reference area 13c to the threshold editing change area 34a, the threshold reference area 34b, and the illumination color reference area 34c of the memory unit 34 of the PC 3 respectively. Further, the PC control unit 32 refers to the threshold reference data and the illumination color reference data in the memory unit 34, reads color data (blue, green, and red) corresponding to thresholds ("shallow", "medium", and "deep"), and displays the thresholds on the screen in such a manner that, for example, a threshold "shallow" is displayed in blue (B), a threshold "medium" is displayed in green (G), and a threshold "deep" is displayed in red (R) as illustrated in FIG. 6 (step S31).

The ON-position change mode of the keyboard program 39 is first selected. Here, when the user clicks on the ON-position change 40 with the mouse 38 while looking at the screen of the display unit 36, an image imitating the keyboard 1 to be changed is displayed on the screen as illustrated in FIG. 6.

Figure 5:
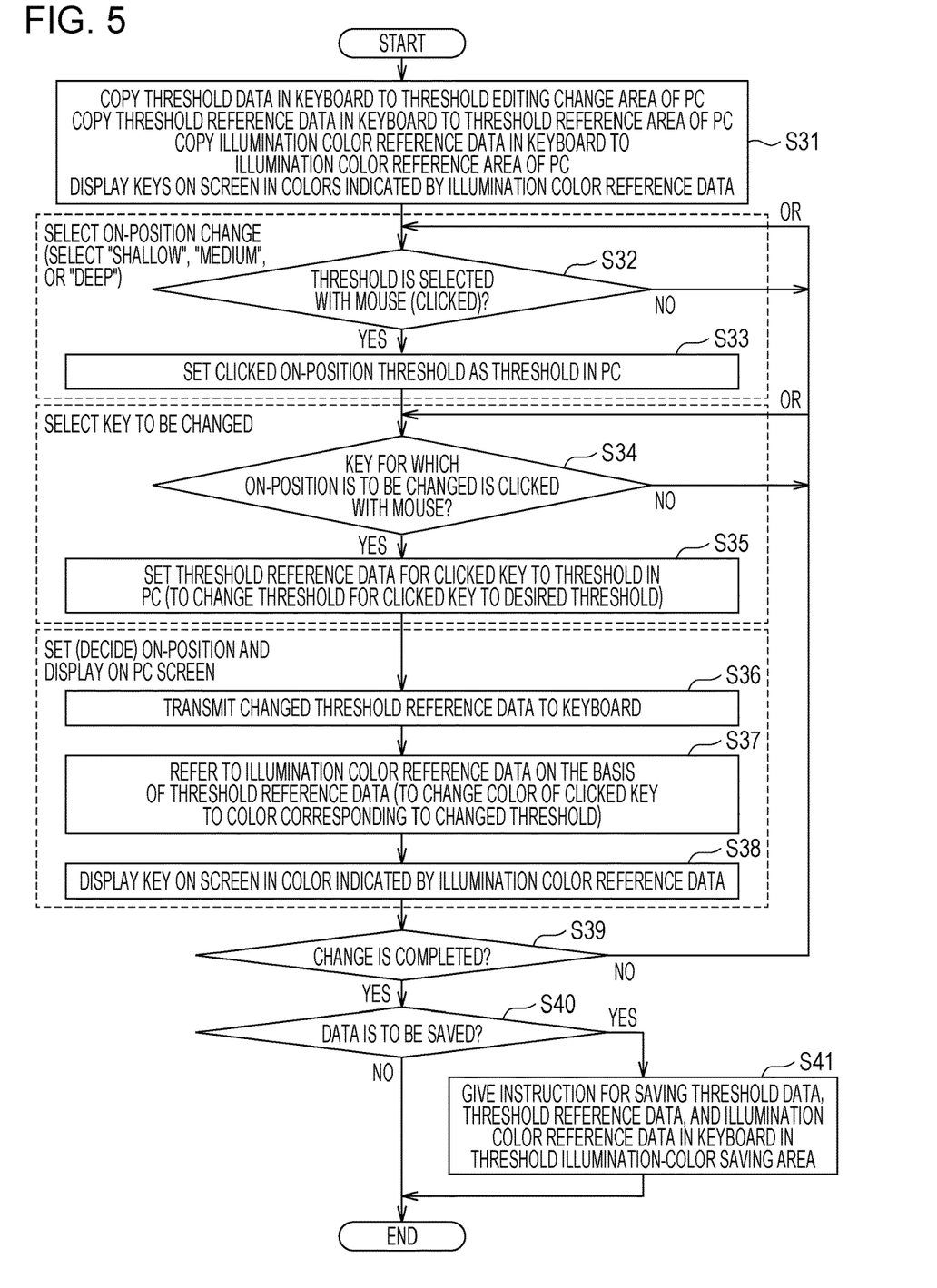
FIG. 5 is a flowchart illustrating processing in a key ON-sensing position change mode according to the first embodiment.

In the ON-position change mode, a selection of a threshold can be made from the three-level thresholds of "shallow", "medium", and "deep" with the mouse 38 so as to facilitate user operations. For example, for a full keystroke of 4.0 mm, a selection can be made from among a threshold of a normal value of 2.2 mm, a threshold for a shallower keystroke of 1.5 mm, and a threshold for a deeper keystroke of 3.0 mm.

In the ON-position change mode, the user first uses the mouse 38 to select a selection button on the screen corresponding to a value ("shallow" (1.5 mm), "medium" (2.2 mm), or "deep" (3.0 mm)) to which a threshold is to be changed while looking at the screen of the display unit 36 (step S32). When a value is selected with the mouse 38, a threshold in the PC 3 is set to the value of "shallow", "medium", or "deep" (step S33).

Next, when the user moves the mouse pointer to a key 105a for which the value is to be set in the keyboard image on the screen illustrated in FIG. 6 and clicks on the key 105a with the mouse 38 (step S34), the threshold for the key is changed to the value selected previously ("shallow", "medium", or "deep") (changed by software). That is, at the time of the click, the threshold reference data for the specified key in the threshold reference area 34b of the memory unit 34 of the PC 3 is changed to the threshold in the PC (step S35).

At the same time, the color of the key on the screen is changed to the corresponding color described above. That is, the illumination color reference data (color data) in the illumination color reference area 34c corresponding to the changed threshold reference data in the threshold reference area 34b is transmitted to the display control unit 35, and the color on the screen is changed. Accordingly, the user can recognize that the threshold has been changed by software (in the PC).

Further, this information (identification information of the key (indicating which key is the changed key) and the changed value (the value of "shallow", "medium", or "deep") is transmitted to the keyboard 1 via the communication control unit 31 (step S36). That is, when the user only clicks on a key without performing, on the keyboard 1, a special operation for deciding to change a threshold, a change is made to the key.

Further, to change the color of the clicked key to the color corresponding to the changed threshold, the illumination color reference data is referred to on the basis of the threshold reference data (step S37). The key is displayed on the screen in a color indicated by the illumination color reference data (step S38).

In a case where the user wants to change another key, the user clicks on the key, so that the user can change the threshold to the value selected previously. When the user selects another threshold by using a selection button and clicks on a key to be changed, the threshold for the key is changed to the selected threshold.

In the ON-sensing position change mode, when a key code is transmitted from the keyboard 1, the PC 3 changes the color of the key on the screen corresponding to the code to a color (for example, white) other than the above-described colors, and the display unit 36 displays the key on the screen corresponding to the code in the color (for example, white) other than the above-described colors. Note that this process is not illustrated in FIG. 5.

If the ON-sensing position change is completed (Yes in step S39), all the changes are saved as a file in, for example, the hard disk (steps S40 and S41), and the processing ends. Note that the saving is performed as desired. When the keyboard program is executed next time, the set values are transferred from the keyboard 1, and the processing starts.

(Processing by Keyboard 1 in ON-Sensing Position Change Mode)

Figure 7:
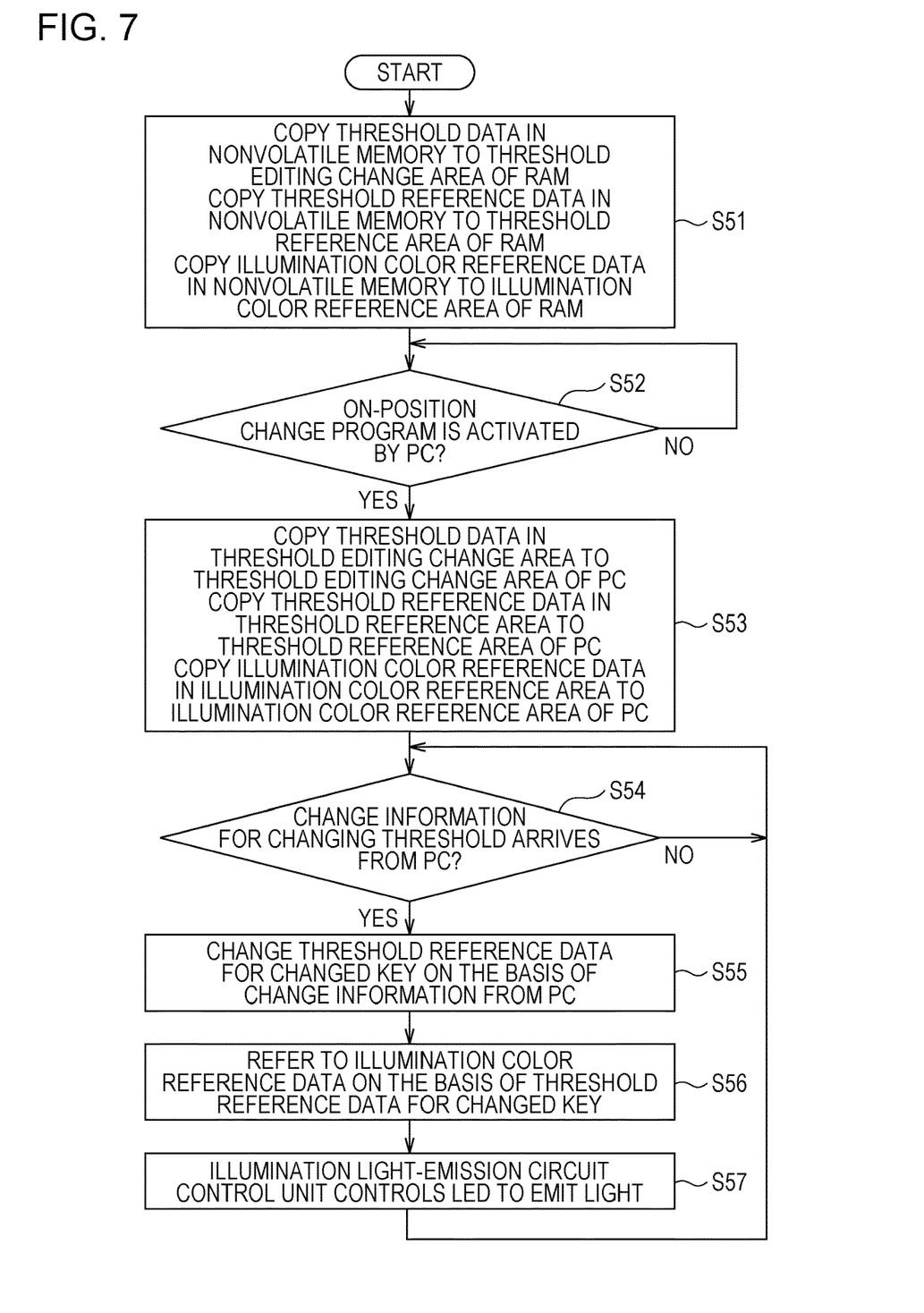
FIG. 7 is a flowchart illustrating ON-sensing position change control by the keyboard according to the first embodiment.

Now, processing by the keyboard 1 in the ON-position change mode is described with reference to the flowchart illustrated in FIG. 7. When the PC 3 is in the ON-position change mode of the keyboard program 39, the keyboard 1 performs the following processing.

Note that, while the processing is performed, the input processing by the keyboard 1 is simultaneously performed by the multitask function. At the time of start-up of the keyboard 1, the threshold data, the threshold reference data, and the illumination color reference data saved in the nonvolatile memory 12 are copied to the threshold editing change area 13a, the threshold reference area 13b, and the illumination color reference area 13c of the RAM 13 (step S51).

Next, when the keyboard program 39 of the PC 3 is executed (step S52), the keyboard control unit 2 transmits, in response to a request from the PC 3, all of the threshold data saved in the threshold editing change area 13a of the keyboard 1, the threshold reference data in the threshold reference area 13b, and the illumination color reference data in the illumination color reference area 13c to the PC 3 via the communication control unit 21 for copying to the threshold editing change area 34*a*, the threshold reference area 34*b*, and the illumination color reference area 34*c* (step S53).

Further, if the keyboard program 39 is changed to the ON-position change mode from the other mode and change information (identification information of a key and a changed value) for changing a threshold arrives from the PC 3 via the communication control unit 21 (YES in step S54), the keyboard control unit 2 changes the threshold reference data in the RAM 13 on the basis of the change information (step S55). When the threshold reference data is saved, the threshold reference data is changed as a new threshold and is used to determine whether a key press occurs.

That is, when a threshold is changed on the PC 3, in other words, when a mouse click operation is performed on the screen, the threshold change is immediately reflected to the keyboard 1. The keyboard control unit 2 changes the threshold reference data, and data to be referred to in the illumination color reference data in the illumination color reference area is changed accordingly (step S56). As a result, the illumination color of the key top 105 is changed. Consequently, the user knows for which key the threshold is changed to which value when looking at the keyboard 1.

Further, the keyboard control unit 2 controls the illumination light-emission control unit 19 so that the illumination LED 17 emits light on the basis of color data (blue indicates "shallow", green indicates "medium", and red indicates "deep") of a color the same as the color set in the PC 3 in accordance with the illumination color reference data in the illumination color reference area. The illumination light-emission control unit 19 refers to the illumination color reference data (color data) on the basis of the threshold reference data (the value of the threshold for each key) and controls light emission by the LED light-emission unit 18.

The illumination LED 17 emits blue light, green light, or red light (step S57). That is, the illumination LED 17 of three colors provided for each key can illuminate the letter on the key top. Accordingly, the user knows for which key the threshold is (currently) set to which value when looking at the keyboard 1.

Further, the threshold reference data and the illumination color reference data that have been changed are saved in the RAM 13, and therefore, are lost when power is shut off. In a case where the user wants to reproduce the threshold reference data and the illumination color reference data in this state at the time of the next start-up, a function (command) of a program of the PC 3 is used to save the threshold reference data and the illumination color reference data in the nonvolatile memory 12 (see step S41 in FIG. 5), and the threshold reference data and the illumination color reference data are recovered at the time of the next start-up (see step S11 in FIG. 3).

(Input Processing by Keyboard in ON-Sensing Position Change Mode)

Figure 8:
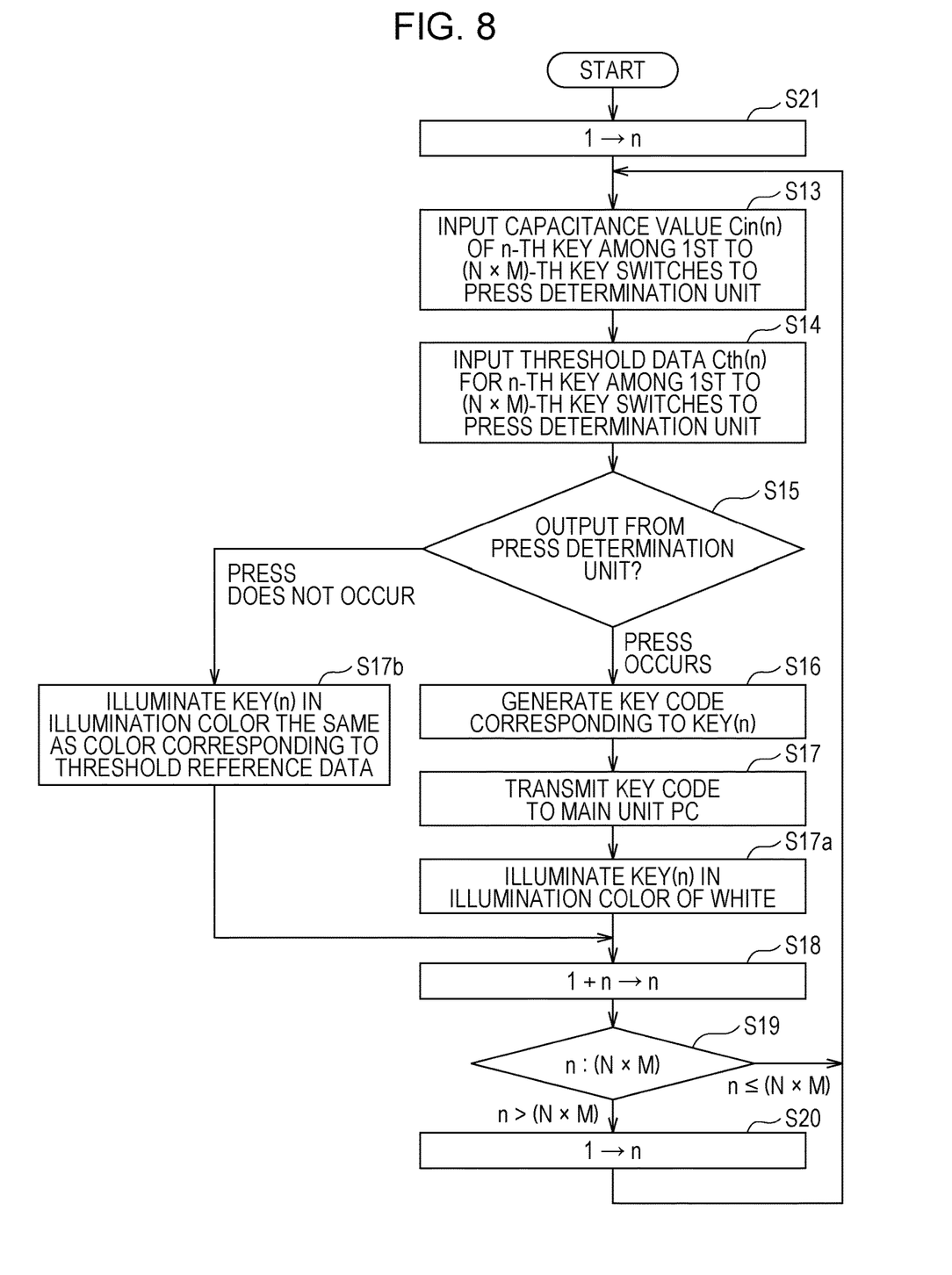
FIG. 8 is a flowchart illustrating key input control by the keyboard according to a modification of the first embodiment of the present invention.

In the ON-position change mode, input processing by the keyboard can be performed in accordance with the flowchart illustrated in FIG. 8. To the flowchart illustrated in FIG. 8, the process of steps S17*a* and S17*b*, which is not included in the flowchart illustrated in FIG. 3, is added. Therefore, the process in steps S17*a* and S17*b* is mainly described.

If the user presses a key (YES in step S15), the keyboard 1 generates a key code corresponding to the key and transmits the key code to the PC 3, and the pressed key top is illuminated in, for example, white, that is, a color other than blue, green, and red (step S17*a*). Accordingly, the user can know that the key is pressed from the change in color.

That is, in a case where the user changes the threshold and presses the key immediately after the change, the user can physically experience the pressing state of the key with the threshold. The key code of the pressed key is transmitted to the PC 3, and therefore, the user can check the press state of the key by software (with screen display, etc.).

If the user does not press a key (NO in step S15), the key is illuminated in an illumination color the same as the color corresponding to the threshold reference data (step S17*b*), and the flow proceeds to step S18.

As described above, in the keyboard threshold change apparatus and the keyboard according to the embodiment, the thresholds of the ON-sensing positions of the keys are indicated by the illumination colors in the keyboard 1, and therefore, the user can check which key has which threshold (position and value) when looking at the keyboard 1. The thresholds are indicated not by numerical values (1.5 mm, etc.) or text (high, medium, and low) but by colors, and therefore, the user can easily recognize the thresholds.

When the threshold of an ON-sensing position in the keyboard 1 is changed by the program 39 of the PC 3 (by a click), the changed threshold is immediately indicated as a change in color, that is, the illumination color in the keyboard 1 is changed. Therefore, the user can immediately check the position of the changed key and the changed threshold.

Further, when the threshold of an ON-sensing position in the keyboard 1 is changed by the program 39 of the PC 3, the illumination color of the changed key is immediately changed on the screen of the PC 3, and the color is the same as the illumination color in the keyboard 1. Therefore, a misunderstanding arising from the screen display and the actual object (keyboard) can be prevented.

Further, when the threshold of an ON-sensing position in the keyboard 1 is changed by the keyboard program 39 of the PC 3, the press determination unit 16 of the keyboard 1 immediately determines whether the key is pressed on the basis of the threshold. When the user presses the key and the press determination unit 16 determines that the key is pressed, the illumination color of the key changes from the previous color. Therefore, the user can physically experience the ON-sensing position and can immediately make a correction if the ON-sensing position is different from the intended position.

Further, when the threshold of an ON-sensing position in the keyboard 1 is changed by the keyboard program 39 of the PC 3, the press determination unit 16 of the keyboard 1 immediately determines whether the key is pressed on the basis of the threshold. When the user presses the key and the press determination unit 16 determines that the key is pressed, the illumination color of the key changes, and the key on the screen of the PC 3 is displayed in a color the same as the illumination color of the key. Therefore, the user can check the key press with both the screen of the PC 3 and the keyboard 1.

Further, the illumination colors can be individually changed by a program of the PC 3 or the keyboard 1.

OTHER EMBODIMENTS

Note that the present invention described above relates to a keyboard having capacitive key switches; however, the keyboard need not be a capacitive keyboard. The keyboard 1 may be any keyboard as long as the keyboard is an analog input device that includes switches for which thresholds can be set and from which the occurrence of a press (on/off) can be output. For example, the keyboard can be constituted by switches of various types including a pressure-sensitive type, an electrical resistance type, a magnetism-sensitive type, an ultrasonic type, and an optical type. Further, the keyboard program need not be a program for Windows and may be a program for any OS as long as the OS has a GUI.

Further, the embodiment describes the example where the threshold is selected from three types; however, the threshold is not limited to this. The threshold may be selected from four or five types or more than five types as long as the user can recognize differences in color. Further, as described above, the input unit is not limited to the mouse and may be a touch panel or a touch pad. Further, the keyboard 1 can be used as the input unit. This can be realized by, for example, using two arrow keys (the up arrow key and the down arrow key) of the keyboard to select a threshold and using the four arrow keys to select a key from the key image on the screen.

REFERENCE SIGNS LIST 1 keyboard
2 keyboard control unit
3 personal computer (PC)
10 key group
11 key-scan detection unit
12A memory unit
12 nonvolatile memory
13 random access memory (RAM)
14 key-scan control unit
15 key capacitance detection unit
16 press determination unit
17 illumination LED
18 LED light-emission unit
19 illumination light-emission control unit
21, 31 communication control unit
32 PC control unit
33 hard disk
34 memory unit
35 display control unit
36 display unit
37 input control unit
38 mouse
39 program
103 key switch unit
105 key top
105a key (image)
107 plunger
109 rubber member
111 housing
115 spacer
117 spring

The invention claimed is:

1. A keyboard threshold change apparatus comprising:
 a keyboard that includes:
  an illumination unit illuminating key tops of a plurality of keys and a threshold change unit capable of changing, for each key of the plurality of keys, a threshold used to determine an occurrence of a press of each key; and
  a press determination unit that, after the threshold for a key of the plurality of keys has been changed with an input unit, determines a particular occurrence of a press of the key and, in response to the particular occurrence of the press of the key, outputs a key code of the key; and
 a computer that is connected to the keyboard and that includes the input unit used to input the threshold and an image output unit outputting, as an image, the threshold input by the input unit, wherein:
  when the threshold for a particular key of the plurality of keys is changed with the input unit, the threshold change unit changes, based at least in part on the threshold changed with the input unit, the threshold for the particular key in the keyboard, and the illumination unit changes an illumination color of the particular key for which the threshold is changed to a color corresponding to the threshold; and
  when the press determination unit outputs the key code to the computer, the illumination unit changes the illumination color of the particular key to a different color.

2. The keyboard threshold change apparatus of claim 1, wherein when the threshold for the particular key is changed with the input unit, the image output unit outputs a particular image of the particular key in the color corresponding to the threshold.

3. The keyboard threshold change apparatus of claim 1, wherein the image output unit outputs, based at least in part on the key code from the keyboard, a particular image of the particular key in the different color changed by the illumination unit.

4. A keyboard comprising:
 an illumination unit that illuminated key tops of a plurality of keys;
 a threshold change unit that is capable of changing, for each key of the plurality of keys, a threshold used to determine an occurrence of a press of each key; and
 a press determination unit that, when the threshold for a key is changed by the threshold change unit, determines a particular occurrence of a press of the key and, in response to determining the particular occurrence of the press of the key, outputs a key code of the key, wherein:
  when the threshold for a particular key of the plurality of keys is changed by the threshold change unit, the illumination unit changes an illumination color of the particular key for which the threshold is changed to a color corresponding to the threshold; and
  when the press determination unit outputs the key code of the key, the illumination unit changes the illumination color of the particular key to a different color.

* * * * *